United States Patent
Maniatopoulos et al.

(10) Patent No.: US 8,154,670 B2
(45) Date of Patent: Apr. 10, 2012

(54) SCREEN, ESPECIALLY FOR THE SEAT OF A MOTOR VEHICLE

(75) Inventors: Ioannis Maniatopoulos, Burscheid (DE); Wolfgang Pellenz, Rheinbach (DE); Robin Ndagijimana, Neuss (DE); Philipp Helmich, Bergisch Gladbach (DE)

(73) Assignee: Johnson Controls Technology Company, Holland, MI (US)

( * ) Notice: Subject to any disclaimer, the term of this patent is extended or adjusted under 35 U.S.C. 154(b) by 1538 days.

(21) Appl. No.: 10/528,878

(22) PCT Filed: Sep. 22, 2003

(86) PCT No.: PCT/EP03/10491
§ 371 (c)(1),
(2), (4) Date: Jan. 26, 2006

(87) PCT Pub. No.: WO2004/028861
PCT Pub. Date: Apr. 8, 2004

(65) Prior Publication Data
US 2006/0156350 A1    Jul. 13, 2006

(30) Foreign Application Priority Data
Sep. 23, 2002  (DE) .................................. 102 44 100

(51) Int. Cl.
*H04N 5/64*   (2006.01)
*A47F 5/00*   (2006.01)
*A47F 7/00*   (2006.01)
*F16M 11/00*  (2006.01)
*F16M 13/00*  (2006.01)
*B65D 75/58*  (2006.01)

(52) U.S. Cl. ...................... 348/837; 248/124.1; 206/738
(58) Field of Classification Search ................... 348/837
See application file for complete search history.

(56) References Cited

U.S. PATENT DOCUMENTS

| | | | |
|---|---|---|---|
| 5,161,028 A   | 11/1992 | Kawata et al. | |
| 5,207,471 A * | 5/1993  | Mutschler et al. | 296/37.12 |
| 5,513,746 A * | 5/1996  | Anderson | 206/738 |
| 5,559,670 A * | 9/1996  | Flint et al. | 361/679.06 |
| 6,056,248 A * | 5/2000  | Ma | 248/124.1 |
| 6,157,418 A * | 12/2000 | Rosen | 348/837 |
| 6,179,263 B1  | 1/2001  | Rosen et al. | |
| D437,837 S *  | 2/2001  | Harrison et al. | D14/132 |
| 6,361,012 B1* | 3/2002  | Chang | 248/324 |
| D456,789 S *  | 5/2002  | Snyker | D14/132 |
| 6,661,571 B1* | 12/2003 | Shioda et al. | 359/372 |
| 6,698,832 B2* | 3/2004  | Boudinot | 297/217.4 |

(Continued)

FOREIGN PATENT DOCUMENTS

DE    197 08 764 A1    11/1997

(Continued)

*Primary Examiner* — Christopher S Kelley
*Assistant Examiner* — Hee-Yong Kim
(74) *Attorney, Agent, or Firm* — Foley & Lardner LLP

(57) ABSTRACT

A video screen assembly for a vehicle seat is movable between an upper position and a lower position and includes a fitting and a pivoting arm. A belt drive connects the pivoting arm and the video screen such that a torque applied to move the pivoting arm results in a torque being transmitted to move the video screen by preferably a directly proportional angular amount. The video screen can be rotated to a storage position where the vide screen display is protected from cargo with in the vehicle.

19 Claims, 4 Drawing Sheets

U.S. PATENT DOCUMENTS

| | | | |
|---|---|---|---|
| 7,036,879 B2 * | 5/2006 | Chang | 297/217.3 |
| 7,448,679 B2 * | 11/2008 | Chang | 297/217.3 |
| 2003/0086240 A1 * | 5/2003 | Jobs et al. | 361/683 |
| 2005/0140191 A1 * | 6/2005 | Curran et al. | 297/217.3 |
| 2007/0019510 A1 * | 1/2007 | Takakuwa et al. | 369/30.08 |

FOREIGN PATENT DOCUMENTS

| | | |
|---|---|---|
| DE | 198 00 538 A1 | 9/1998 |
| DE | 100 42 495 A1 | 3/2002 |
| DE | 102 44 100 A1 | 4/2004 |

* cited by examiner

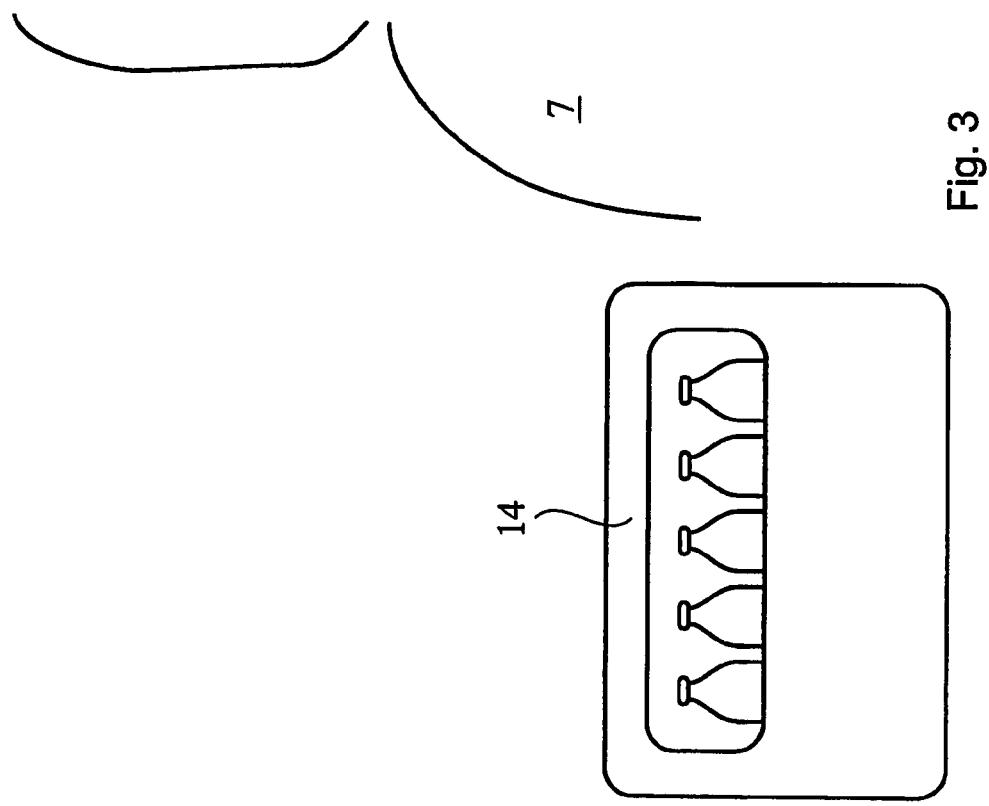
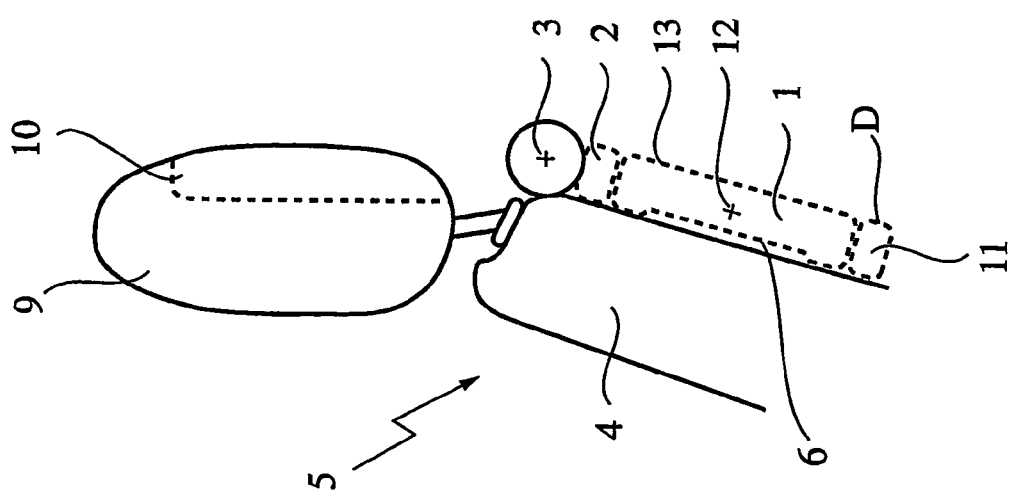
Fig. 3

SCREEN, ESPECIALLY FOR THE SEAT OF A MOTOR VEHICLE

BACKGROUND OF THE INVENTION

The invention relates to a video screen which is pivotally arranged on a fitting, especially on the back rest of a vehicle seat.

A video screen of the generic type is disclosed in the publication DE 197 08 764 A1. In the vehicle seat for a railroad car disclosed therein a screen, which can be viewed by a passenger seated behind, is let centrally into the rear side of the back rest. The angle of inclination of the screen can be adjusted and the screen can therefore be tilted about a horizontal axis running transversely to the direction of the seat, both for adjustment to the stature of the viewer and to avoid reflected light on the surface of the screen. The facilities for adjustment are limited, however, and are therefore capable of yielding a satisfactory result only with a relatively large interval between the seats. This is something which is not always feasible, particularly in compact motor vehicles.

The object of the invention is to provide a video screen which is particularly suitable for fitting in a motor vehicle and which can be viewed comfortably by occupants of different stature.

SUMMARY OF THE INVENTION

According to the invention this object is achieved in that a video screen of the generic type can be adjusted, in particular folded from a first, lower position of use into a second, upper position of use.

The video screen is preferably arranged on a pivoting arm, which is connected to the fitting so that it can rotate about a basically horizontally axis. At the same time the screen is advantageously capable of pivoting in relation to the fitting through an angle of 150° to 210°, in particular approximately 180°, from the first position of use, especially under the effect of a spring force opposed to the gravitational force, towards the viewer up into the second, basically vertical position of use.

In order to prevent damage to the video screen when not in use, the video screen can furthermore be pivoted from a stowed position upwards into the first, lower position of use. For this purpose it preferably performs a rotation through an angle of 10° to 20°, in particular approximately 15°, from the stowed position into the first, lower position of use.

According to a further advantageous development of the invention the video screen is in turn rotatably supported on the pivoting arm and is rotatable about a basically horizontal, but in principle also vertical or inclined axis in relation to the pivoting arm, for example through an angle of 150° to 210°, in particular approximately 180°. At its end facing of the screen, the pivoting arm preferably forms a frame, inside which the screen is rotatably arranged. In this case the axis of rotation of the screen may run centrally in the frame, but also asymmetrically with an offset in relation to the center of the frame.

In order to hold the video screen securely in each position of use, the articulated joints between the fitting and the pivoting arm and/or between the pivoting arm and the screen may be provided with a non-positive arresting device and/or positive locking device.

The articulated joint between the fitting and the pivoting arm and the articulated joint between the pivoting arm and the screen furthermore advantageously interact with one another through the use of a torque transmitting device, in such a way that when folding the pivoting arm in relation to the fitting the screen is turned through a basically equal angle in relation to the pivoting arm. This automatically ensures that the viewing window faces the viewer both in the lower and in the upper position of use. At the same time it is in principle possible to have the screen rotate in the same or in the opposite direction to the direction of rotation of the pivoting arm. The torque transmitting device may then take the form, for example, of a belt drive with belt strands running parallel to one another or crossing one another.

A vehicle seat is equipped to particular advantage with a screen according to the invention where the screen is rotatably supported in the area of the upper edge of the back rest. In this case the screen is preferably arranged behind the rear side of the back rest in the first, lower position of use, and behind the head restraint in the second, upper position of use. If the vehicle seat in question is occupied by the driver or front-seat passenger of a motor vehicle, for example, the screen can be comfortably viewed not only in the lower position of use by children sitting in the second row of seats but also in the upper position of use by adults sitting in the same location. The screen may equally well be arranged on the back rest of the second row of seats and viewed by the occupants of a third row of seats, which have of late become common in so-called multipurpose vehicles.

To protect it from cargo, the screen, in a stowed position, for example, can preferably be adjusted by turning it through an angle of 150° to 210°, in particular through approximately 180°, in relation to the pivoting arm into a protected position in which its display is turned towards the back rest.

BRIEF DESCRIPTION OF THE DRAWINGS

The drawings show schematic representations of various exemplary embodiments of the invention, in which FIG. 3 shows the vehicle seat represented in FIGS. 1 and 2 with screen in the stowed position

DETAILED DESCRIPTION

Figure 1:
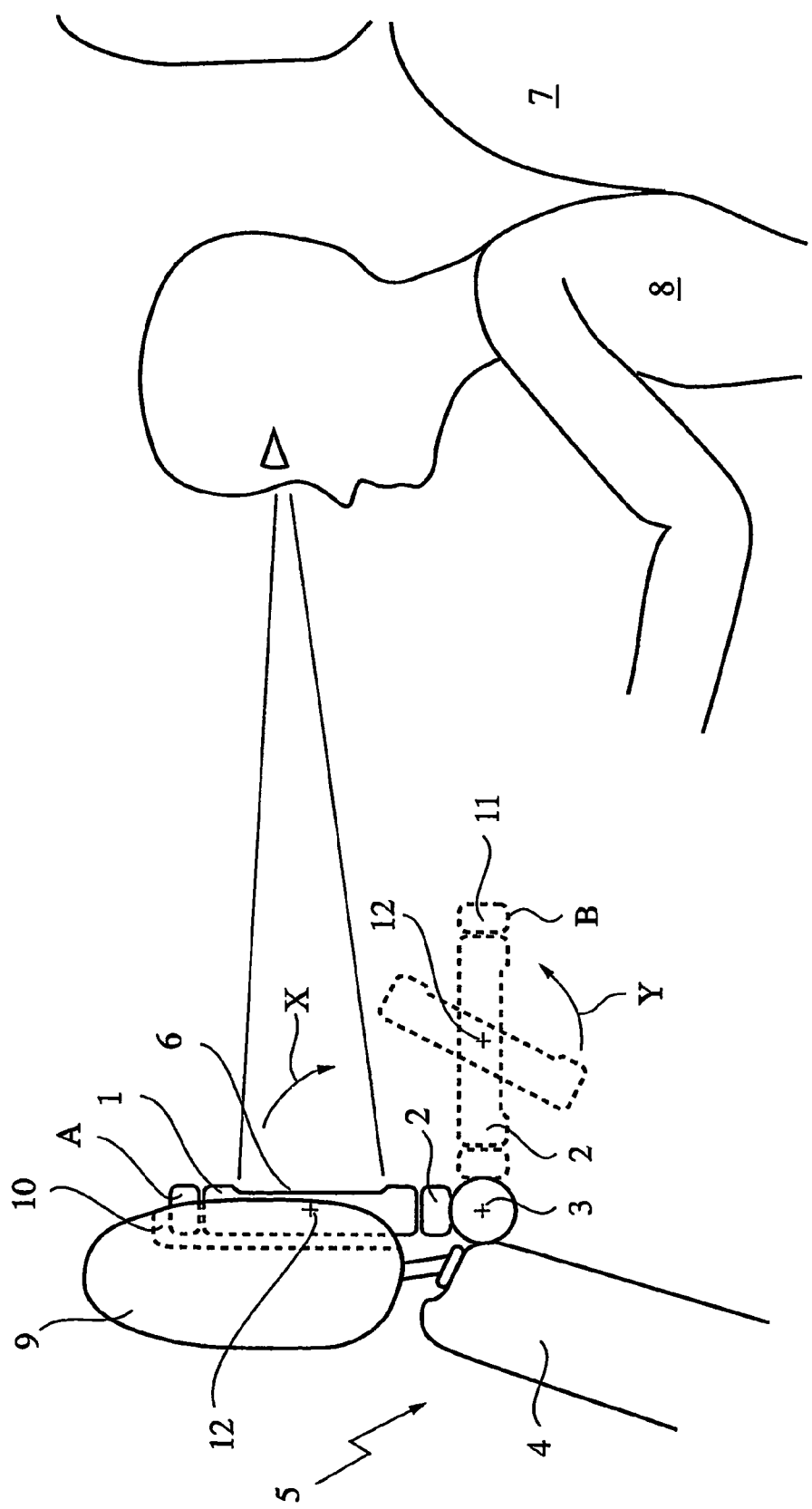
FIG. 1 shows a motor vehicle seat, equipped according to the invention with a screen in the upper position of use, and an intermediate position

A video screen 1 represented in FIG. 1 can be folded, by means of a pivoting arm 2, about a horizontal axis of rotation 3 running transversely to the direction of a seat, the screen 1 being arranged on the upper edge of the back rest 4 of a vehicle seat 5, for example of the driver's or front passenger seat of a motor vehicle. In an upper position of use (position A) the display 6 of the screen 1 is situated basically at eye level for an adult occupant 8 of the vehicle, seated on the rear seat 7, on the rear side of the head restraint 9 of the vehicle seat 5. On its rear side, the head restraint 9 has a recess 10, which partially accommodates the screen 1 in the upper position of use.

The pivoting arm 2 has a rectangular frame 11, which fully encloses the screen 1. The screen 1 is supported centrally in the frame 11 so that it can rotate about a further axis of rotation 12 offset parallel to the axis of rotation 3.

The articulated joints assigned to the axes of rotation 3 and 12 are equipped with means for releasable locking, in order to keep the screen 1 in the upper position of use and the display 6 at the desired inclination relative to the viewer.

Figure 2:
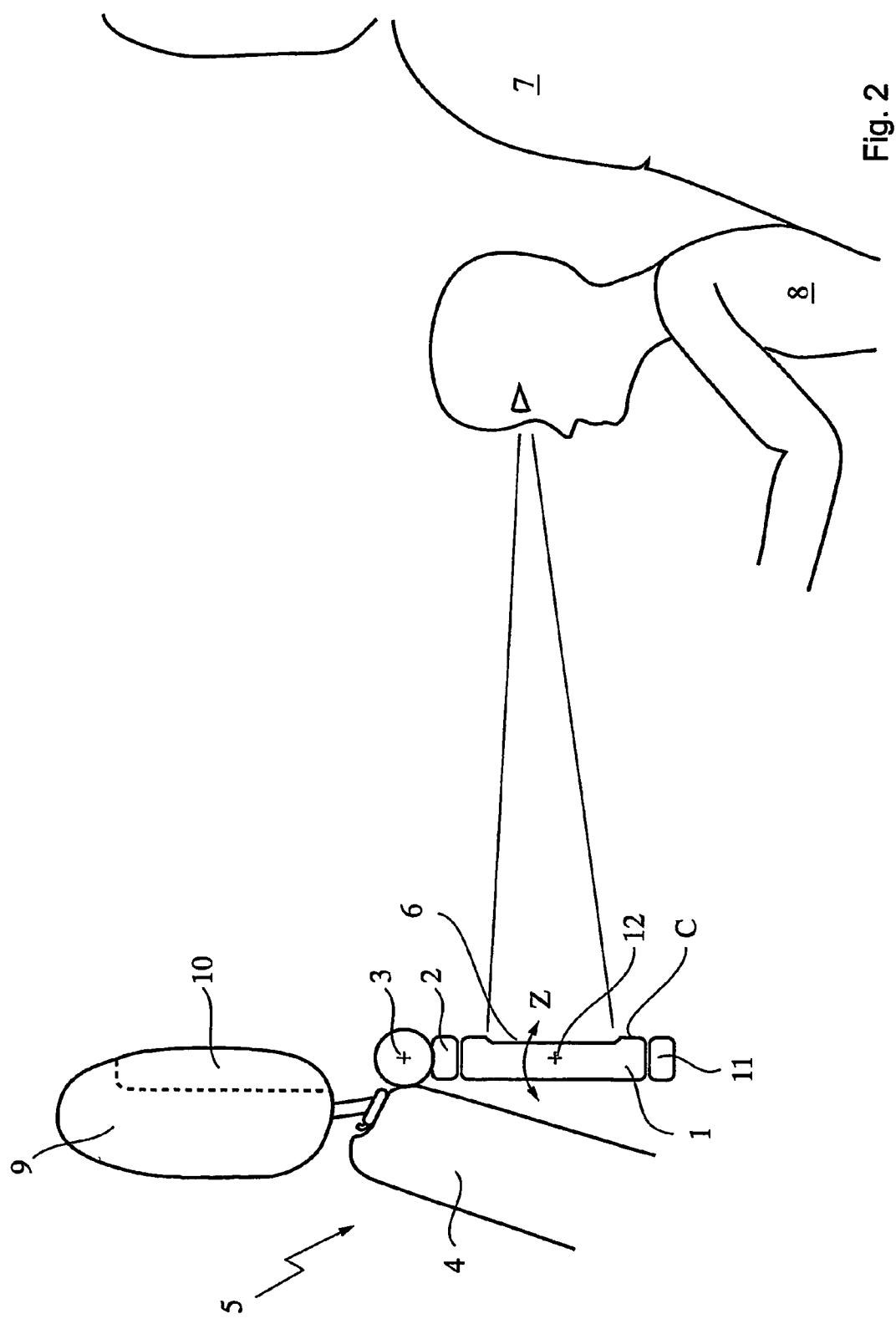
FIG. 2 shows the seat according to FIG. 1 with screen in the lower position of use

By folding the pivoting arm 2 downwards (arrow X) through approximately 180° about the axis of rotation 3 towards the rear seat 7 (intermediate position B), the screen can be shifted into a further, lower position of use (position C), which is depicted in FIG. 2. The screen is now situated behind the back rest 4 of the vehicle seat 5. In order that the display 6 will also face the occupant 8 in the lower position of use, the screen 1 in the intermediate position according to FIG. 1 is in turn rotated through approximately 180° (arrow Y) in the frame 11. In the exemplary embodiment, this movement is performed manually. By tilting the screen 1 in the frame 11 (arrow Z) a further adjustment to suit the position of the occupant 8 can be performed in each position of use.

In order to protect the display 6 of the screen 1 from damage when not in use, it can furthermore be brought into the stowed position D represented in FIG. 3, which is inclined by approximately 15° to the back rest 4 compared to the lower position of use (position C). Before adjusting it to the stowed position D, the screen 1 must be folded from the lower position of use (position C) into the intermediate position B, in which the screen 1 is rotated in the frame 11 about the axis of rotation 12 in such a way that the display 6 in the stowed position D is turned towards the backrest 4. Consequently only the robust rear side 13 of the screen 1 is exposed to potential contact with cargo 14 situated on the rear seat 7.

From the upper position of use (position A) the screen 1 can be folded about the axis of rotation 3 straight into the stowed position D, since in this case the display 6 already has the desired orientation in relation to the back rest 4.

An automatic turning of the screen 1 in the frame 11 when folding it down from the upper into the lower position of use can be brought about in that the rotational movement in the axis of rotation 3 is transmitted to the axis of rotation 12 in the same or in the opposite direction.

Figure 4:
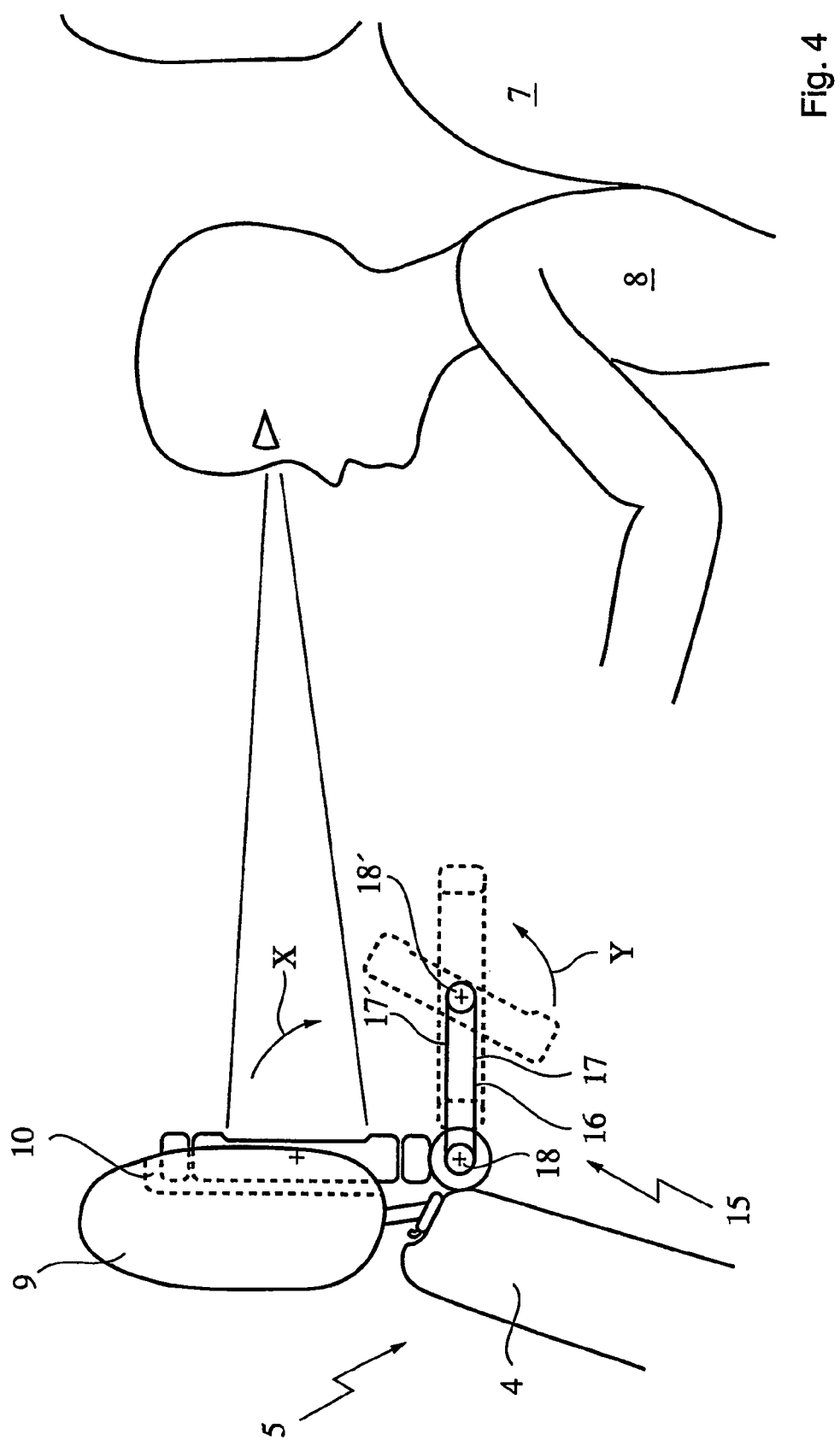
FIG. 4 shows a vehicle seat having a screen according to claim 12.

In the exemplary embodiment according to FIG. 4 a belt drive 15, comprising a belt 16 with belts strands 17, 17' running parallel to one another and belt pulleys 18, 18' arranged in the area of the axes of rotation 3, 12, which synchronizes the rotation in the direction of the arrows X and Y, is used for this purpose.

The invention claimed is:
1. A video screen assembly for mounting to a vehicle seat, the video screen assembly comprising:
   a fitting for pivotally mounting the video screen to the vehicle seat, the video screen being adjustable from a first, lower, position of use to a second, upper, position of use;
   a pivoting arm connected to the fitting for rotation about a generally horizontal axis of rotation, the pivoting arm having a frame that encloses the video screen, the video screen being rotatable relative to the frame;
   a spring having a spring force opposed to the gravitational force when moving the video screen between the first and second positions; and
   a first articulated joint between the fitting and the pivoting arm and a second articulated joint between the frame and the video screen, wherein the first and second articulated joints each comprise a releasable non-positive arresting device,
   wherein the video screen is rotatable, in relation to the fitting, though an angle of 150 degrees to 210 degrees from the first position of use to the second position of use, and
   wherein the video screen is configured to be pivoted backwards toward the vehicle seat through an angle of 10 degrees to 20 degrees from the first, lower, position of use to a stowed position.

2. The video screen assembly of claim 1, wherein the video screen is rotatable about a basically horizontal axis of rotation in relation to the pivoting arm.

3. The video screen assembly of claim 2, wherein the video screen is rotatable through an angle of 150 degrees to 210 degrees, in particular approximately 180 degrees, in relation to the pivoting arm.

4. The video screen assembly of claim 1, wherein the pivoting arm, at its end facing the video screen, comprises a frame, inside which the video screen is rotatably arranged.

5. The video screen assembly of claim 1, wherein the first and second articulated joint interact with one another through the use of a torque transmitting device, in such a way that when folding the pivoting arm in relation to the fitting, the video screen is turned through a basically equal angle in relation to the pivoting arm.

6. The video screen assembly of claim 5, wherein the torque-transmitting device comprises a belt drive.

7. A vehicle seat having a head restraint and a back rest having a rear side having an upper edge, the vehicle seat comprising the video screen assembly of claim 1.

8. The vehicle seat of claim 7, wherein the video screen assembly is arranged in the rear side of the backrest in the first, lower position of use and behind the hear restraint in the second, upper position of use.

9. The vehicle seat of claim 8, wherein the video screen is pivotable to the stowed position through an angle of 150 degrees to 210 degrees, in relation to the pivoting arm and can be shifted to a protected position in which the video screen display side is turned towards the rear side of the back rest.

10. A video screen assembly configured to be mounted to a vehicle seat for use by an occupant positioned behind the vehicle seat, the video screen assembly comprising:
   a first joint defining a first axis of rotation, the first axis of rotation configured to be a substantially horizontal axis extending transverse to the vehicle seat;
   an arm coupled to the first joint and rotatable about the first axis of rotation between a first use position and a second use position;
   a frame coupled to the arm;
   a second joint provided at the frame, the second joint defining a second axis of rotation, the second axis of rotation being substantially parallel to the first axis of rotation; and
   a video screen supported at the frame and mounted to the second joint, the video screen having a front side and a rear side, a display being provided on the front side,
   wherein the video screen is rotatable relative to the frame about the second axis of rotation between approximately 150 degrees and approximately 210 degrees so that the display can face the occupant when the arm is in both the first use position and the second use position, wherein the screen rotates about the second axis of rotation automatically when the frame rotates between the first use position and the second use position.

11. The video screen assembly of claim 10, wherein the first use position is a lower position and the second use position is an upper position, the first use position being between approximately 150 degrees and approximately 210 degrees offset from the second use position.

12. The video screen of assembly of claim 11, wherein the first use position is approximately 180 degrees offset from the second use position.

13. The video screen assembly of claim 10, wherein the first joint comprises a releasable locking device configured to retain the frame in an angular position about the first axis that has been selected by the occupant.

14. The video screen assembly of claim 10, wherein the second joint comprises a releasable locking device configured to retain the screen in an angular position about the second axis that has been selected by the occupant.

15. The video screen assembly of claim 10, wherein the video screen is rotatable approximately 180 degrees about the second axis when the frame is in a position that is between the first use position and the second use position.

16. The video screen assembly of claim 10, further comprising a belt drive configured to synchronize the rotation of the frame about the first axis of rotation and the rotation of the screen about the second axis of rotation.

17. A vehicle seat having a head restraint and a backrest having a rear side having an upper edge, the vehicle seat comprising the video screen assembly of claim 10.

18. The vehicle seat of claim 17, wherein the video screen assembly is configured to be substantially behind the backrest in the first use position and substantially behind the head restraint in the second use position.

19. The vehicle seat of claim 18, wherein the frame is further rotatable about the first axis of rotation to a stowed position that is past the first position, the display of the screen is configured to face the backrest when the frame is in the stowed position.

* * * * *

UNITED STATES PATENT AND TRADEMARK OFFICE
CERTIFICATE OF CORRECTION

PATENT NO.       : 8,154,670 B2                          Page 1 of 1
APPLICATION NO.  : 10/528878
DATED            : April 10, 2012
INVENTOR(S)      : Ioannis Maniatopoulos et al.

It is certified that error appears in the above-identified patent and that said Letters Patent is hereby corrected as shown below:

On the title page, item (54) and in column 1, lines 1-2, please change the Title from "Screen, Especially for the Seat of a Motor Vehicle" to --Video Screen Incorporated in Vehicle Seat--.

Signed and Sealed this
Eleventh Day of September, 2012

David J. Kappos
*Director of the United States Patent and Trademark Office*